(12) United States Patent
Mieritz

(10) Patent No.: US 11,408,867 B2
(45) Date of Patent: Aug. 9, 2022

(54) SULFATE DETECTION WITH BARIUM

(71) Applicant: Hach Company, Loveland, CO (US)

(72) Inventor: Daniel Gustav Mieritz, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 450 days.

(21) Appl. No.: 16/529,594

(22) Filed: Aug. 1, 2019

(65) Prior Publication Data

US 2021/0033579 A1 Feb. 4, 2021

(51) Int. Cl.
*G01N 31/22* (2006.01)
*G01N 31/02* (2006.01)

(52) U.S. Cl.
CPC ............ *G01N 31/22* (2013.01); *G01N 31/02* (2013.01)

(58) Field of Classification Search
CPC ................. G01N 31/22; G01N 31/02
See application file for complete search history.

(56) References Cited

U.S. PATENT DOCUMENTS 3,533,940 A * 10/1970 Johnson ............... C02F 1/5263
210/728

FOREIGN PATENT DOCUMENTS

| CN | 103033501 A | 4/2013 |
|----|-------------|--------|
| JP | S6386466 A | 3/1988 |

OTHER PUBLICATIONS

Spectrophotometric determination of sulphate in automotive fuel ethanol by sequential injection analysis using dimethylsulphonazo (III) reaction. Fabio Santos de Oliveira and Mauro Korn Taianta 68(2006) 992-999 (Year: 2006).*
EDTA Tirtation of Ba2+ May 9, 2019 (Year: 2019).*
European Patent Office, Communication, EP Search Report, dated Dec. 10, 2020, pp. 7.
De Oliveira F Set al: "Spectrophotometric determination of sulphate in automotive fuel ethanol by sequential injection analysis using dimethylsulphonazo(III) reaction", Talanta, Elsevier, Amsterdam, NL, vol. 68, No. 3, Jan. 15, 2006 (Jan. 15, 2006), pp. 992-999.
"Del Rio V et al: "Detemination of sulphate in water and biodiesel samples by a sequential injection analysis—Multivariate curve resolution method"" Analytca Chimica Acta, Elsevier, Amsterdam, NL, vol. 676, No. 1-2, Aug. 31, 2010 (Aug. 31, 2010) pp. 28-33, XP027236537, ISSN: 0003-2670.
"Karlsson M et al: Determination of trace in water using in-line levels of sulphate flow-injection and preconcentration" Analytica Chimica Acta, Elsevir, Amsterdam, NL, vol. 244, Jan. 1, 1991 (Jan. 1, 1991), pp. 109-113.

(Continued)

*Primary Examiner* — Brian R Gordon
*Assistant Examiner* — Dwan A Gerido
(74) *Attorney, Agent, or Firm* — Ference & Associates LLC

(57) ABSTRACT

An embodiment provides a method for measuring sulfate in an aqueous sample, including: introducing an aqueous sample containing an amount of sulfate to a barium dye complex, thereby creating a solution; adding a clarifying agent to the solution, thereby causing the solution to be clarified; and measuring the amount of sulfate in the aqueous sample by measuring a change in color of the solution, the change in color caused by the barium dye complex mixing with the sulfate. Other aspects are described and claimed.

10 Claims, 4 Drawing Sheets

(56) References Cited

OTHER PUBLICATIONS

"Yu M Dedkov et al: "New metallochromic indicator for barium: Determination of sulfate in water and soil extracts"" Journal of Analytical Chemistry, Kluwer Academy Publishers—Plenum Pubushers, NE vol. 61, No. 12, Dec. 1, 2006 (Dec. 1, 2006) pp. 1154-1162.
J.R. Munger et al., "Volumetric Determination of Sulfate Ion", Analytical Chemistry, Nov. 1950, 3 pages, vol. 22, No. 11, ACS Publications.

* cited by examiner

SULFATE DETECTION WITH BARIUM

BACKGROUND

This application relates generally to measuring sulfate in aqueous or liquid samples, and, more particularly, to the measurement of sulfate using a barium-dye complex.

Ensuring water quality is critical in a number of industries such as pharmaceuticals, environmental protection, and other manufacturing fields. Additionally, ensuring water quality is critical to the health and well-being of humans, animals, and plants which are reliant on the water for survival. One component of water that is typically measured is sulfate. Too much sulfate in water can be harmful to humans or animals. Therefore, detecting the presence and concentration of sulfate in water or other liquid solution is vital.

BRIEF SUMMARY

In summary, one embodiment provides a method for measuring sulfate in an aqueous sample, comprising: introducing an aqueous sample containing an amount of sulfate to a barium dye complex, thereby creating a solution; adding a clarifying agent to the solution, thereby causing the solution to be clarified; and measuring the amount of sulfate in the aqueous sample by measuring a change in color of the solution, the change in color caused by the barium dye complex mixing with the sulfate.

Another embodiment provides a measurement device for measuring an amount of sulfate in a solution, comprising: a processor; and a memory storing instructions executable by the processor to: introduce an aqueous sample containing an amount of sulfate to a barium dye complex, thereby creating a solution; add a clarifying agent to the solution, thereby causing the solution to be clarified; and measure the amount of sulfate in the aqueous sample by measuring a change in color of the solution, the change in color caused by the barium dye complex mixing with the sulfate.

A further embodiment provides a method for measuring sulfate in an aqueous sample, comprising: introducing an aqueous sample containing an amount of sulfate to a barium dye complex, thereby creating a solution, wherein the barium dye complex comprises eriochrome black T (BaEBT); adding a clarifying agent to the solution, thereby causing the solution to be clarified; filtering a precipitate, wherein the precipitate is a result of the mixing of the barium dye complex and an aqueous sample containing an amount of sulfate; and measuring the amount of sulfate in the aqueous sample by measuring a change in color of the solution, the change in color caused by the barium dye complex mixing with the sulfate, wherein the sulfate releases a dye from the barium dye complex.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
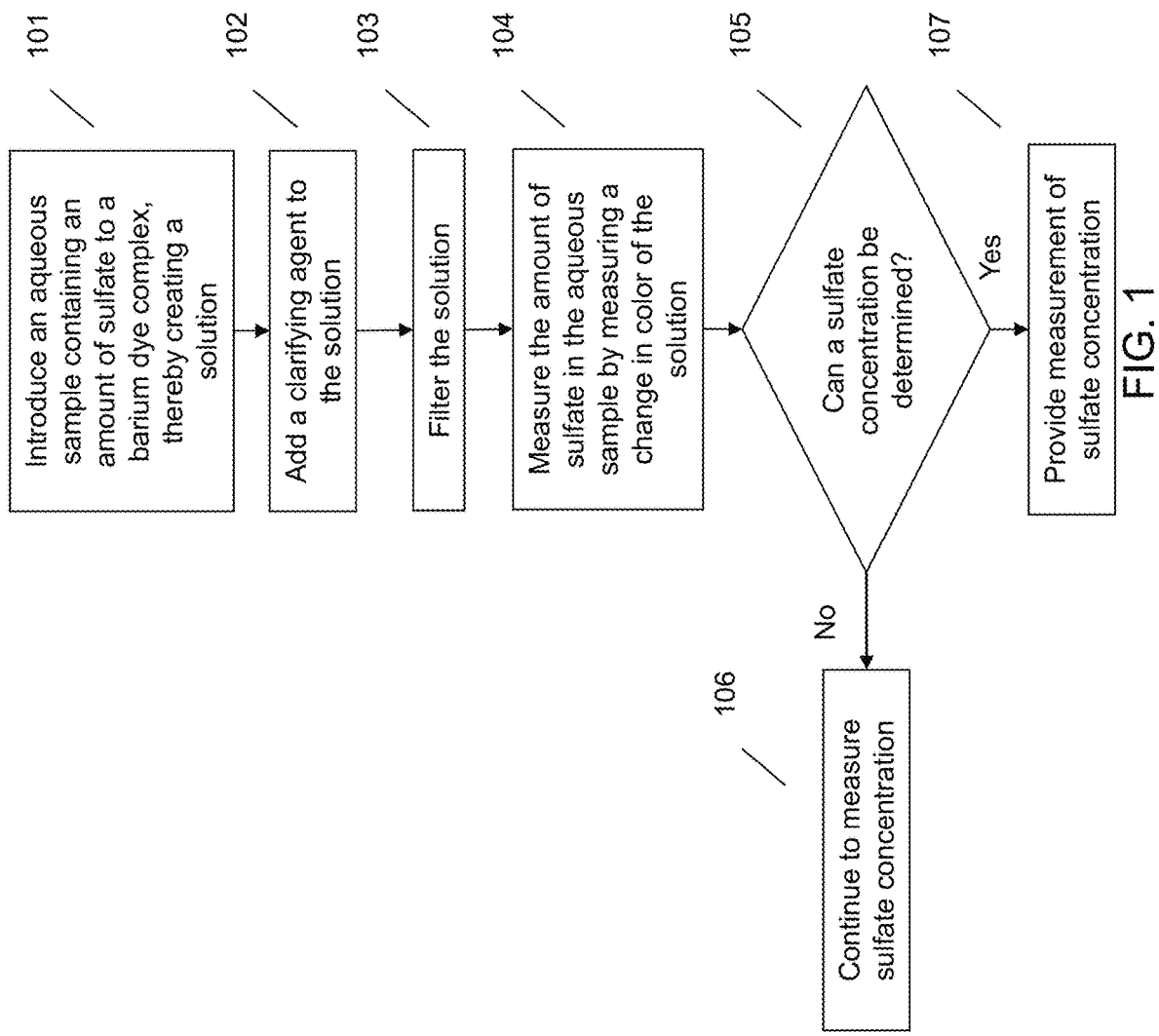
FIG. 1 illustrates a flow diagram of an example sulfate measuring system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventional methods of sulfate measurement in water or an aqueous sample may have some limitations. For example, sulfate measurement may be used to determine the quality of water. High concentrations of sulfate may be harmful to animals, humans, and/or plants. Accordingly, as another example, a user or entity may want the sulfate in a body of water to be under a particular threshold, therefore, the user may measure the sulfate in order to determine if the amount of sulfate is under that threshold. The measurement of sulfate may be used to test water quality for applications such as drinking water, industrial waste, mine effluent, or the like.

Previous methods for the measurement of sulfate have limitations. For example some methods are prone to user error. The user error may arise from improper mixing or measuring of reagents necessary to measure sulfate. Error may also be introduced from an end user improperly calibrating equipment.

For example, one method for sulfate measurement requires measuring solids content with a spectrophotometer. A sample may be mixed with a barium salt. The barium salt may precipitate barium sulfate. The spectrophotometer may be used to measure the solid or precipitated content. However, measuring turbidity with a colorimetric technique may not be accurate. Such techniques may yield measurements with high fluctuations. The fluctuations may arise from multiple sources.

For example, the sample may not be homogeneous. In other words a tested portion of a sample may not represent the whole sample. As another example, fluctuations in measurement may arise from factors that affect light scattering in the measurement process. Additionally, colorimetric techniques to measure sulfate may require titration. Titration requires both time and care by the end user for a proper measurement. Colorimetric techniques may also require the preparation of a blank. The blank may be used to calibrate an instrument for measurement. Improper preparation of a blank may yield erroneous measurements.

Accordingly, an embodiment provides a system and method for measuring sulfate in an aqueous solution mixture or sample. A solution mixture or solution may refer to a sample solution and a barium-dye complex, as the barium-dye complex may not be soluble. In an embodiment, an aqueous sample containing an amount of sulfate may be introduced to a barium dye complex. The barium dye complex may contain eriochrome black T (BaEBT). The introduction of the barium dye complex with an aqueous solution containing an amount of sulfate may be referred to as a solution mixture. The introduction of the aqueous sample containing an amount of sulfate to the barium dye complex may form a precipitate. The precipitate may be removed in a number of methods. For example, the precipitate may be given time to allow settling, the precipitate may be filtered from the solution mixture, or the like. In an embodiment, the barium dye complex may be immobilized. The barium dye complex may be in a filter. In an embodiment, a clarifying agent may be added to the solution mixture. The solution mixture may be brought to a proper pH with a buffer. The buffer may be imidazole buffer. In an embodiment, the barium dye complex may be reactive with the amount of sulfate in the aqueous sample. The reaction of the barium dye complex with sulfate may yield a color. The color may be measured using absorbance measurements. The absorbance may be correlated to an amount of sulfate in the aqueous sample.

The illustrated example embodiments will be best understood by reference to the figures. The following description is intended only by way of example, and simply illustrates certain example embodiments.

Referring to FIG. 1, an example system and method for detection of sulfate in an aqueous sample is illustrated. In an embodiment, an aqueous sample containing sulfate may be introduced to a barium-dye complex. Alternatively, the barium dye complex may be introduced into an aqueous sample containing sulfate. In an embodiment, the barium dye complex in the presence of sulfate from an amount of sulfate in an aqueous sample may release dye molecules from the barium dye complex. An amount of sulfate in an aqueous sample may be determined by the absorbance change of the colorimetric indicator from the methods describes herein.

At 101, in an embodiment, an aqueous sample may be introduced to a barium dye complex. The aqueous sample may contain an amount of sulfate. The aqueous sample may be a sample from any aqueous volume. Example samples may include drinking water, industrial waste, mine effluent, or the like, however, applications are not limited to listed examples. The barium dye complex may contain eriochrome black T (BaEBT). In an embodiment, the barium-dye complex may contain CI Pigment 48 which may be referred to as CI Pigment Red 48:1. In an embodiment, the barium dye complex may be synthesized by combining the dye with barium chloride in a 1:1 mole ratio and filtering the precipitate. In an embodiment, approximately 10 mg of barium dye complex per 100 ml of aqueous sample may be used. However, the amount of barium dye complex may be adjusted based upon use application, range of sulfate detection, type of sample to be tested, or the like. The barium dye complex may be introduced to an aqueous sample in many forms. For example, the barium dye complex may be introduced as a liquid or a solid. In an embodiment, the barium dye complex may be immobilized in a stationary phase. For example, the barium dye complex may be on a filtering medium. As another example, the barium dye complex may be on a test strip. In an embodiment, the barium dye complex may be in an imidazole buffer. In an embodiment, the barium dye complex and imidazole buffer may be in a pH range of between approximately 7.2 to 8.0. Other pH ranges are contemplated and disclosed.

The aqueous sample may be an aqueous sample which may include a sample from a natural body of water, a holding tank, a processing tank, a pipe, or the like. The aqueous sample may be in a continuous flow, a standing volume of liquid, or any combination thereof. In one embodiment, the solution may be introduced to one or more chambers or vessels, for example, a test chamber of the measurement device. In an embodiment, the measurement device may be a hand held device. A hand held device may have advantages such as lower cost, portability, field use, or the like. Alternatively, the measurement device may be a larger bench top device. Introduction of the aqueous sample into the measurement device may include placing or introducing the solution mixture into a test chamber manually by a user or using a mechanical means, for example, gravity flow, a pump, pressure, fluid flow, or the like. For example, an aqueous sample for measurement may be introduced to a measurement or test chamber using a pump. In an embodiment, valves or the like may control the influx and efflux of the aqueous solution mixture into or out of the one or more chambers, if present.

Additionally or alternatively, the measurement device may be present or introduced in a volume of the aqueous sample. The measurement device is then exposed to the volume of aqueous sample where it may perform measurements. The system may be a flow-through system in which a solution mixture and/or reagents are automatically mixed and measured. Once the sample is in contact with the measurement system, the system may measure an amount of sulfate in the sample, as discussed in further detail herein. In an embodiment, the measurement device may include one or more chambers in which the one or more method steps may be performed.

At 102, in an embodiment, the solution mixture may be clarified. The solution mixture may be a mix of the barium dye complex and the aqueous sample containing an amount of sulfate. The clarifying may be used to reduce the turbidity of the solution mixture. The clarifying may enable a proper measurement of a color change and associated measurement of an amount of sulfate using colorimetric techniques. In an embodiment, the clarifying agent may be chitosan. Other clarifying agents may be used. The chitosan may be dispersed through the solution mixture to clarify the solution mixture. In an embodiment, the clarifying may be performed at or around pH 5.0. The clarifying may be performed in the presence of an acetate buffer.

At 103, in an embodiment, the solution mixture may be filtered. In an embodiment, the solution mixture contains the barium dye complex and the aqueous sample containing an amount of sulfate. The addition of the barium dye complex to an aqueous sample containing an amount of sulfate may form a precipitate. For proper sulfate measurement, the precipitate may need to be removed from the solution mixture. In an embodiment, the barium dye complex may be immobilized in a stationary phase, for example, a filter media. In an embodiment, the filtering may be a separate step. Alternatively, the barium dye complex may be introduced to the solution by the filter itself. Additionally or alternatively, a precipitate may be allowed to settle. For example, after the introduction of the barium dye complex to the aqueous sample, the precipitate may settle over time and then a liquid sample may be taken for sulfate measurement. In an embodiment, the filtering may be an optional step. For example, acidification with an acid may be performed with the clarifying step, and the acidification may eliminate or reduce the need to filter the solution mixture.

Figure 2:
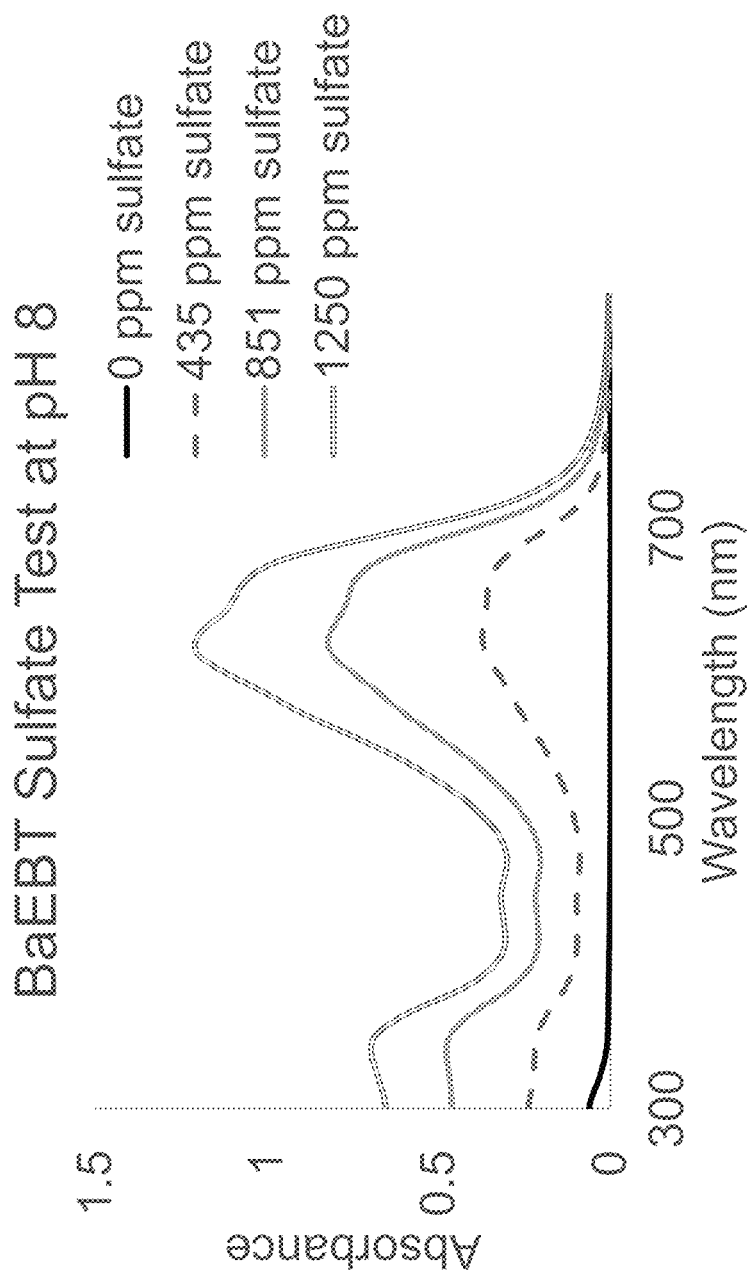
FIG. 2 illustrates an absorbance curve of an example barium dye complex for detection of sulfate.
Figure 3:
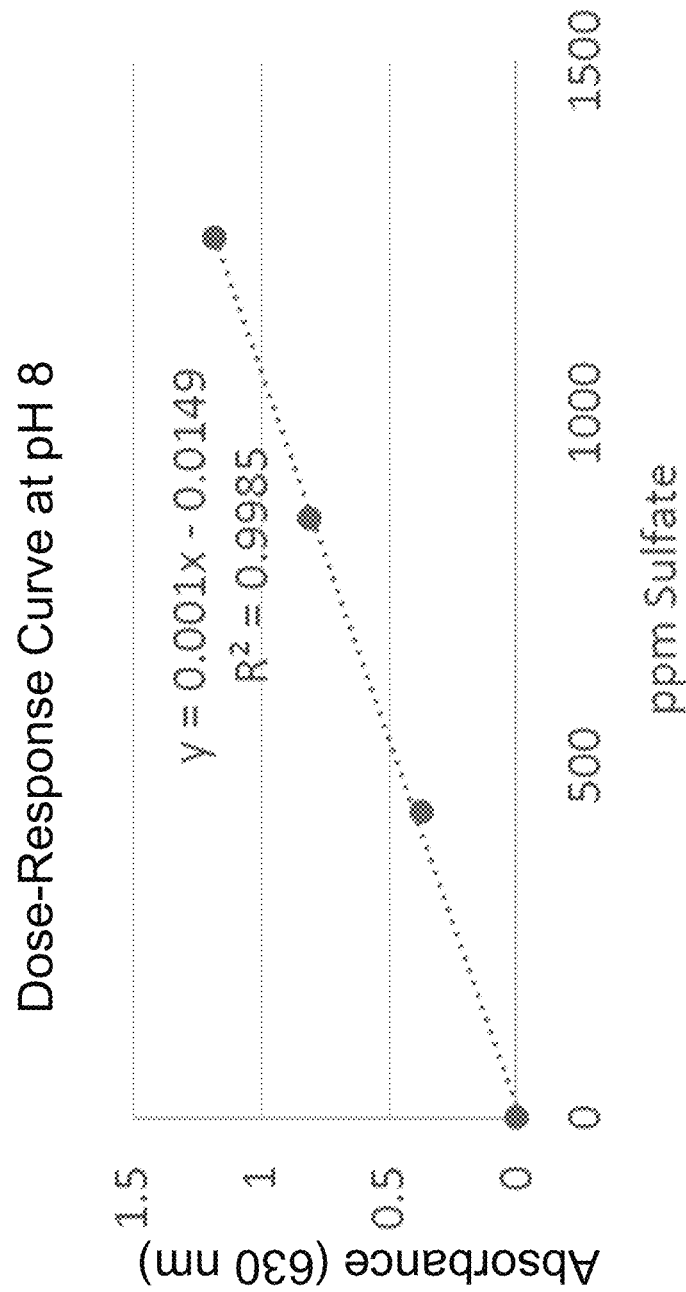
FIG. 3 illustrates an example dose response curve using a barium dye complex sensitive to sulfate.

At 104, in an embodiment, the system and method may measure the amount of sulfate in the aqueous sample by measuring a change in color of the solution. In an embodiment, the colorimetric indicator may give a measurable parameter, such as color or absorbance, to the amount of sulfate in the aqueous sample. (see FIG. 2). For example, a higher amount of sulfate in an aqueous sample may yield a higher absorbance intensity. In an embodiment, a spectrophotometer may be used to measure absorbance. The spectrophotometer may be bench top unit or a unit designed for use for continuous or periodic monitoring built for a specific application and environment. A dose-response curve may plot absorbance values and amount of sulfate (see FIG. 3).

At 105, in an embodiment, the system and method may determine if an amount of sulfate in an aqueous sample may be measured. In an embodiment, the presence of an amount of sulfate in an aqueous sample may cause an increase in absorbance intensity of the dye or colorimetric indicator. The dye may be released from the barium dye complex in the presence of sulfate. In an embodiment, the dye released from the barium dye complex in the presence of sulfate may cause a change in color of the solution as described above. Examples of this increase in absorbance intensity and dose response curves for a colorimetric indicator may be illustrated in FIG. 2 and FIG. 3. Absorbance curves may be generated for a range of sulfate concentrations, for different experimental conditions, for any different condition that may affect absorption (e.g., temperature, sample content, turbidity, viscosity, measurement apparatus, aqueous sample chamber, pH, etc.), or the like.

Alternatively or additionally, sulfate concentration measurement may be at periodic intervals set by the user or preprogrammed frequencies in the device. Measurement of sulfate by a device allows for real time data with very little human involvement in the measurement process. Cleaning of the absorbance chamber may be required at an unspecified time interval. A programmed calibration curve may be entered into the device.

A chamber, vessel, cell, chamber, or the like may contain an aqueous sample, at least one colorimetric indicator, and associated reagents such as buffers and/or additives. A device may contain one or more bottles of reagents which contain necessary reagents. The reagents contained in the one or more bottles may be pump fed or gravity fed. The flow of the reagents may be metered to ensure proper volume delivery to the measurement cell. The aqueous sample may be fed through a pressured inlet, a vessel, or the like. The aqueous sample may be introduced into the measurement chamber by a pump or gravity fed. The sampling device may be in series or parallel to an aqueous flow. The device may have a system to ensure proper mixing of the aqueous sample, barium dye complex, buffers, acids, and related reagents.

The absorbance intensity or sulfate concentration may be an output upon a device in the form of a display, printing, storage, audio, haptic feedback, or the like. Alternatively or additionally, the output may be sent to another device through wired, wireless, fiber optic, Bluetooth®, near field communication, or the like. An embodiment may use an alarm to warn of a measurement or concentration outside acceptable levels. An embodiment may use a system to shut down water output or shunt water from sources with unacceptable levels of sulfate. For example, a sulfate measuring device may use a relay coupled to an electrically actuated valve, or the like.

At 106, in an embodiment, if an amount of sulfate cannot be determined, the system may continue to measure sulfate. Additionally or alternatively, the system may output an alarm, log an event, or the like.

At 107, in an embodiment, if an amount of sulfate can be determined, the system may provide a measurement of sulfate concentration. The system may connect to a communication network. The system may alert a user or a network. This alert may occur whether an amount of sulfate measurement is determined or not. An alert may be in a form of audio, visual, data, storing the data to a memory device, sending the output through a connected or wireless system, printing the output or the like. The system may log information such as the measurement location, a corrective action, geographical location, time, date, number of measurement cycles, or the like. The alert or log may be automated, meaning the system may automatically output whether a correction was required or not. The system may also have associated alarms, limits, or predetermined thresholds. For example, if an amount of sulfate concentration reaches a threshold. Alarms or logs may be analyzed in real-time, stored for later use, or any combination thereof.

The various embodiments described herein thus represent a technical improvement to conventional sulfate measurement techniques. Using the techniques as described herein, an embodiment may use a method to determine an amount of sulfate in an aqueous sample. This is in contrast to conventional methods with limitations mentioned above. Such techniques provide a faster and more accurate method for measuring sulfate in an aqueous or liquid solution.

Figure 4:
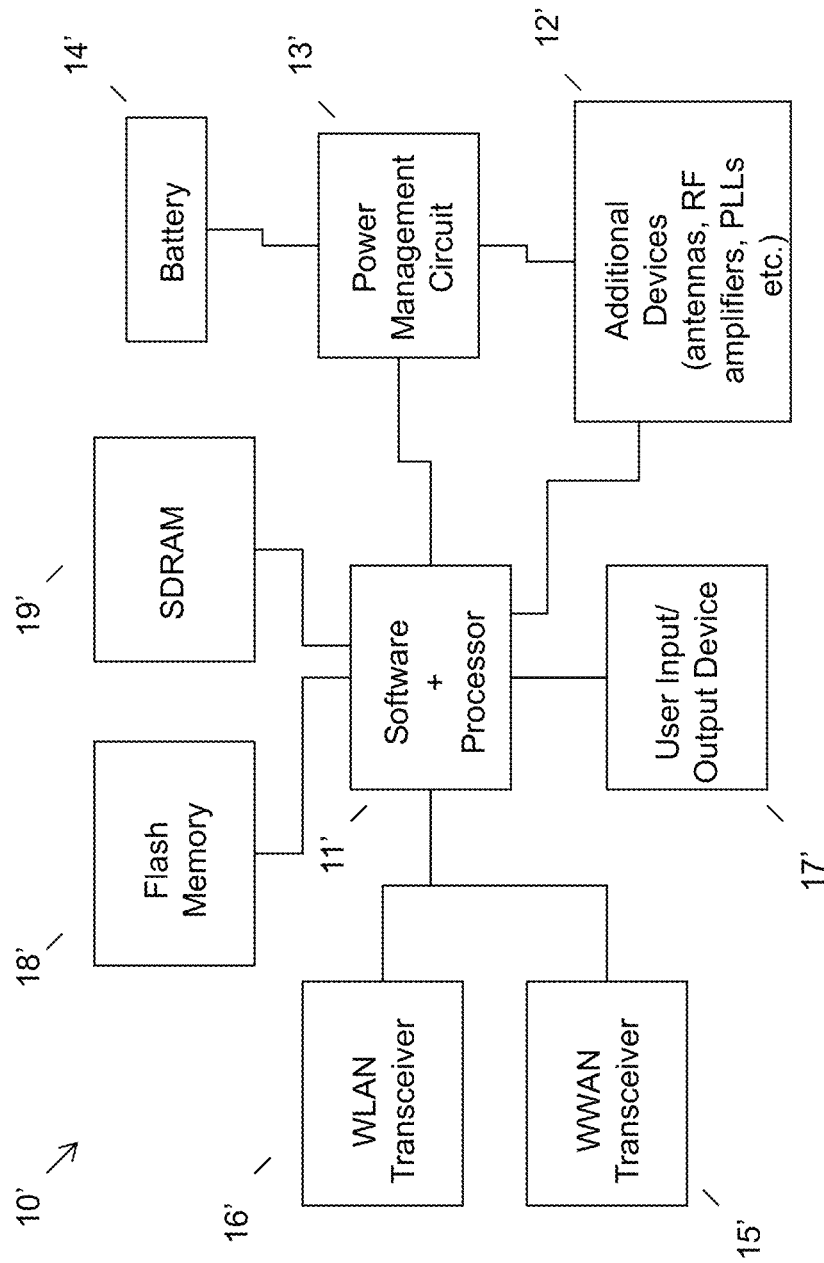
FIG. 4 illustrates an example of computer circuitry.

While various other circuits, circuitry or components may be utilized in information handling devices, with regard to an instrument for measurement of sulfate according to any one of the various embodiments described herein, an example is illustrated in FIG. 4. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform measurement of sulfate of an aqueous sample.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring sulfate in an aqueous sample, comprising:
   introducing an aqueous sample containing an amount of sulfate to a barium dye complex, wherein the barium dye complex comprises barium and eriochrome black T (BaEBT), thereby creating a solution;
   adding a clarifying agent to the solution, thereby causing the solution to be clarified; and
   measuring the amount of sulfate in the aqueous sample by measuring a change in color of the solution, the change in color caused by the barium dye complex mixing with the sulfate.

2. The method of claim 1, further comprising acidifying the solution after adding the clarifying agent.

3. The method of claim 1, further comprising adding an imidazole buffer to the solution.

4. The method of claim 1, further comprising allowing a precipitate to settle, wherein the precipitate is a result of the mixing of the barium dye complex and the aqueous sample containing an amount of sulfate.

5. The method of claim 1, further comprising filtering a precipitate, wherein the precipitate is a result of the mixing of the barium dye complex and the aqueous sample containing an amount of sulfate.

6. The method of claim 1, wherein the barium dye complex is immobilized in a filtering medium.

7. The method of claim 1, wherein the barium dye complex is reactive to sulfate, wherein the sulfate releases a dye from the barium dye complex.

8. The method of claim 1, wherein the measuring comprises a colorimetric measurement technique.

9. The method of claim 1, wherein the change in color is correlated to a concentration of the sulfate in the solution.

10. A method for measuring sulfate in an aqueous sample, comprising:
    introducing an aqueous sample containing an amount of sulfate to a barium dye complex, thereby creating a solution, wherein the barium dye complex comprises barium and eriochrome black T (BaEBT);
    adding a clarifying agent to the solution, thereby causing the solution to be clarified;
    filtering a precipitate, wherein the precipitate is a result of mixing of the barium dye complex and an aqueous sample containing an amount of sulfate; and
    measuring the amount of sulfate in the aqueous sample by measuring a change in color of the solution, the change in color caused by the barium dye complex mixing with the sulfate, wherein the sulfate releases a dye from the barium dye complex.

\* \* \* \* \*